(12) United States Patent
Apparao et al.

(10) Patent No.: US 7,424,476 B2
(45) Date of Patent: Sep. 9, 2008

(54) CATEGORIZED WEB BROWSING HISTORY

(75) Inventors: Vidur Apparao, Palo Alto, CA (US);
John Philip Bandhauer, Aptos, CA (US); Christopher Robert Waterson, San Francisco, CA (US)

(73) Assignee: AOL LLC, Dulles, VA (US)

( * ) Notice: Subject to any disclaimer, the term of this patent is extended or adjusted under 35 U.S.C. 154(b) by 491 days.

(21) Appl. No.: 10/826,480

(22) Filed: Apr. 16, 2004

(65) Prior Publication Data

US 2005/0234940 A1    Oct. 20, 2005

(51) Int. Cl.
*G06F 17/30* (2006.01)
*G06F 15/173* (2006.01)

(52) U.S. Cl. .................. 707/10; 707/10; 707/104.1; 707/200; 709/224; 709/245; 715/745; 715/748

(58) Field of Classification Search ............... 707/1–10, 707/100, 102, 104.1, 200; 709/224, 245; 715/513, 745, 748
See application file for complete search history.

(56) References Cited

U.S. PATENT DOCUMENTS

| | | | | |
|---|---|---|---|---|
| 5,761,436 A * | 6/1998 | Nielsen | ............. | 709/245 |
| 6,049,812 A | 4/2000 | Bertram et al. | ............. | 707/516 |
| 6,067,565 A | 5/2000 | Horvitz | | |
| 6,085,226 A | 7/2000 | Horvitz | | |
| 6,182,133 B1 | 1/2001 | Horvitz | | |
| 6,310,630 B1 | 10/2001 | Kulkarni et al. | ............. | 345/776 |
| 6,401,118 B1 | 6/2002 | Thomas | | |
| 6,427,175 B1 | 7/2002 | Khan et al. | ............. | 709/245 |
| 6,449,640 B1 | 9/2002 | Haverstock et al. | ............. | 709/219 |
| 6,453,342 B1 | 9/2002 | Himmel et al. | ............. | 709/213 |
| 6,460,038 B1 | 10/2002 | Khan et al. | ............. | 707/10 |
| 6,460,058 B2 | 10/2002 | Koppolu et al. | ............. | 707/501.1 |
| 6,460,060 B1 | 10/2002 | Maddalozzo, Jr. et al. | .. | 707/513 |
| 6,493,000 B1 | 12/2002 | Wynn et al. | ............. | 345/733 |
| 6,501,469 B1 | 12/2002 | MacPhail | ............. | 345/419 |
| 6,507,343 B1 | 1/2003 | MacPhail | ............. | 345/440 |
| 6,516,329 B1 | 2/2003 | Smith | ............. | 707/501.1 |
| 6,549,217 B1 | 4/2003 | DeGreef et al. | ............. | 345/745 |
| 6,556,225 B1 | 4/2003 | MacPhail | ............. | 345/848 |
| 6,714,936 B1 | 3/2004 | Nevin, III | | |
| 6,839,680 B1 * | 1/2005 | Liu et al. | ............. | 705/10 |

(Continued)

FOREIGN PATENT DOCUMENTS

EP          1 077 413 A2      2/2001

(Continued)

OTHER PUBLICATIONS

Hodes et al., Composable ad hoc location-based services for heterogeneous mobile clients, 1999, ACM, pp. 411-427.*

(Continued)

*Primary Examiner*—Shahid A Alam
*Assistant Examiner*—Fred I Ehichioya
(74) *Attorney, Agent, or Firm*—Michael A. Glenn; Glenn Patent Group

(57) ABSTRACT

A simple, user-friendly method and apparatus for establishing and maintaining a categorized Web browsing history uses a directory service, such as the Open Directory Project, to get category metadata about visited URLs. Metadata thus obtained are used to present a user's personal browser history in a category based hierarchy.

14 Claims, 6 Drawing Sheets

U.S. PATENT DOCUMENTS

| | | | |
|---|---|---|---|
| 7,080,139 B1 * | 7/2006 | Briggs et al. | 709/224 |
| 2002/0191015 A1 | 12/2002 | Brown et al. | 345/738 |

FOREIGN PATENT DOCUMENTS

| | | |
|---|---|---|
| EP | 1 168 203 A2 | 1/2002 |
| EP | 1 168 204 A2 | 1/2002 |
| KR | 2001-0008189 | 2/2001 |

OTHER PUBLICATIONS

Nadeem et al., A study for of Three Browser history Mechanism for Web Navigation, 2001, IEEE, pp. 13-21.*

Frecon, E. et al.; *Webpath—A Three Dimensional Web History*; Proceedings IEEE Symposium on Information Visualization (Cat. No. 98TB100258), p. 3-10, 148; IEEE Comput. Soc., Los Almaitos, CA, USA; 1998.

Hirsch, F.J.; *Building A Graphical Web History Using TCL/TK*; Proceedings of the Fifth Annual TCL/TK Workshop, p. 159-60; USENIX Assoc., Berkeley, CA, USA; 1997.

Mayer, M. et al.; *Browsing Icons: A Task-Based Approach for a Visual Web History*; Computer Science Department, University of Hamburg, Human Computer Interaction Laboratory, University of Maryland.

Hightower, R.R. et al.; *Graphical Multiscale Web Histories: A Study of PadPrints*; Computer Science Department, University of New Mexico.

Kaasten, S. et al.; *Designing an Integrated Bookmark / History System for Web Browsing*; History Keeping in Computer Applications: A Workshop; Human-Computer Interaction Laboratory, University of Maryland; Dec. 1999.

Cockburn, A. et al.; *WebView: A Graphical Aid for Revisiting Web Pages*; Proceedings of the OZCHI '99 Australian Conference on Human Computer Interaction; Nov. 28-30, 1999.

Gandhi, R. et al.; *Domain Name Based Visualization of Web Histories in a Zoomable User Interface*; Department of Computer Science, University of Maryland.

Robertson, G. et al.; *Data Mountain: Using Spatial Memory for Document Management*; Microsoft Research.

Nadeem, T. et al.; *A Study Of Three Browser History Mechanisms For Web Navigation*; Proceedings Fifth International Conference on Information Visualisation, p. 13-21; IEEE Comput. Soc., Los Alamitos, CA, USA; 2001.

Masuda, H. et al.; *A Design Of A Graphical History Browser with Undo Facility, and Visual Search Analysis*; Transactions of the Institute of Electronics, Information and Communication Engineers D-I, vol. J85D-I, No. 8, p. 798-810; Inst. Electron. Inf. & Commun. Eng.; Aug. 2002.

HOME|HELP Web Page; dmoz open directory project; *About the Open Directory Project* © 1998-2002 Netscape.

ZOOM Web Page; http://www.cnn.com/; *Web as media type*; Moonshine Web.

ZOOM Web Page; http://www.cnn.com/; *Web Capturing*; Moonshine Web.

ZOOM Web Page; http://www.cnn.com/; *Web Categories*; Moonshine.

ZOOM Web Page; http://www.cnn.com/; *Web Favorites and History*; Moonshine.

Dumais, S., et al; *Hierarchical Classification of Web Content*; Microsoft Research; sdumais@microsoft.com; Redmond, WA; USA.

Labrou, Y., et al; *Yahoo! As an Ontology—Using Yahoo! Categories to Describe Documents*; Computer Sci & Electrical Eng Dept; {jklabrou,finin}@cs.umbc.edu; Univ of Maryland; Baltimore, MD; USA.

* cited by examiner

[dmoz] open directory project about dmoz | add URL | help | link | editor login (Search) advanced

Arts
Movies, Television, Music...

Business
Jobs, Real Esate, Investing...

Computers
Internet, Software, Hardware...

Games
Video Games, RPGs, Gambling...

Health
Fitness, Medicine, Alternative...

Home
Family, Consumers, Cooking...

Kids and Teens
Arts, School Time, Teen Life...

News
Media, Newspapers, Weather...

Recreation
Travel, Food, Outdoors, Humor...

Reference
Maps, Education, Libraries...

Regional
US, Canada, UK, Europe...

Science
Biology, Psychology, Physics...

Shopping
Autos, Clothing, Gifts...

Society
People, Religion, Issues...

Sports
Baseball, Soccer, Basketball...

World
Deutsh, Espanol, Francais, Italiano, Japenese, Nederlands, Polska, Svenska...

[Become an Editor] Help Build the largest human-edited directory of the web

Copyright © 1998-2003 Netscape over 3.8 million sites - 57,238 editors - over 460,000 catagories

*FIG. 5*
*(Prior Art)*

CATEGORIZED WEB BROWSING HISTORY

BACKGROUND OF THE INVENTION

1. Technical Field

The invention relates to Web browsing. More particularly, the invention relates to a method and apparatus for establishing and maintaining a categorized Web browsing history.

2. Description of the Prior Art

Browser history is generally shown as one or more flat lists that are column sortable by date last visited, visit count, URL, or page title, etc. It is difficult to find specific items in such lists. It is also difficult to find groups of similar sites that were once found and visited. In frustration, most people often resort to starting from scratch and use a search engine to re-find a site in the same way they found it in first place. Browser history is simply unfriendly.

It would be advantageous to provide a simple, user-friendly method and apparatus for establishing and maintaining a categorized Web browsing history.

SUMMARY OF THE INVENTION

The invention provides a simple, user-friendly method and apparatus for establishing and maintaining a categorized Web browsing history. A presently preferred embodiment of the invention uses a directory service, such as the Open Directory Project, to get category metadata about visited URLs. Metadata thus obtained are used to present a user's personal browser history in a category based hierarchy.

BRIEF DESCRIPTION OF THE DRAWINGS

FIG. 5 is a screen display of a home page for the Open Directory Project; and

DETAILED DESCRIPTION OF THE INVENTION

A presently preferred embodiment of the invention provides a simple, user-friendly method and apparatus for establishing and maintaining a categorized Web browsing history. A presently preferred embodiment of the invention uses a directory service, such as the Open Directory Project, to get category metadata about visited URLs. Metadata thus obtained are used to present a user's personal browser history in a category based hierarchy.

Figure 1:
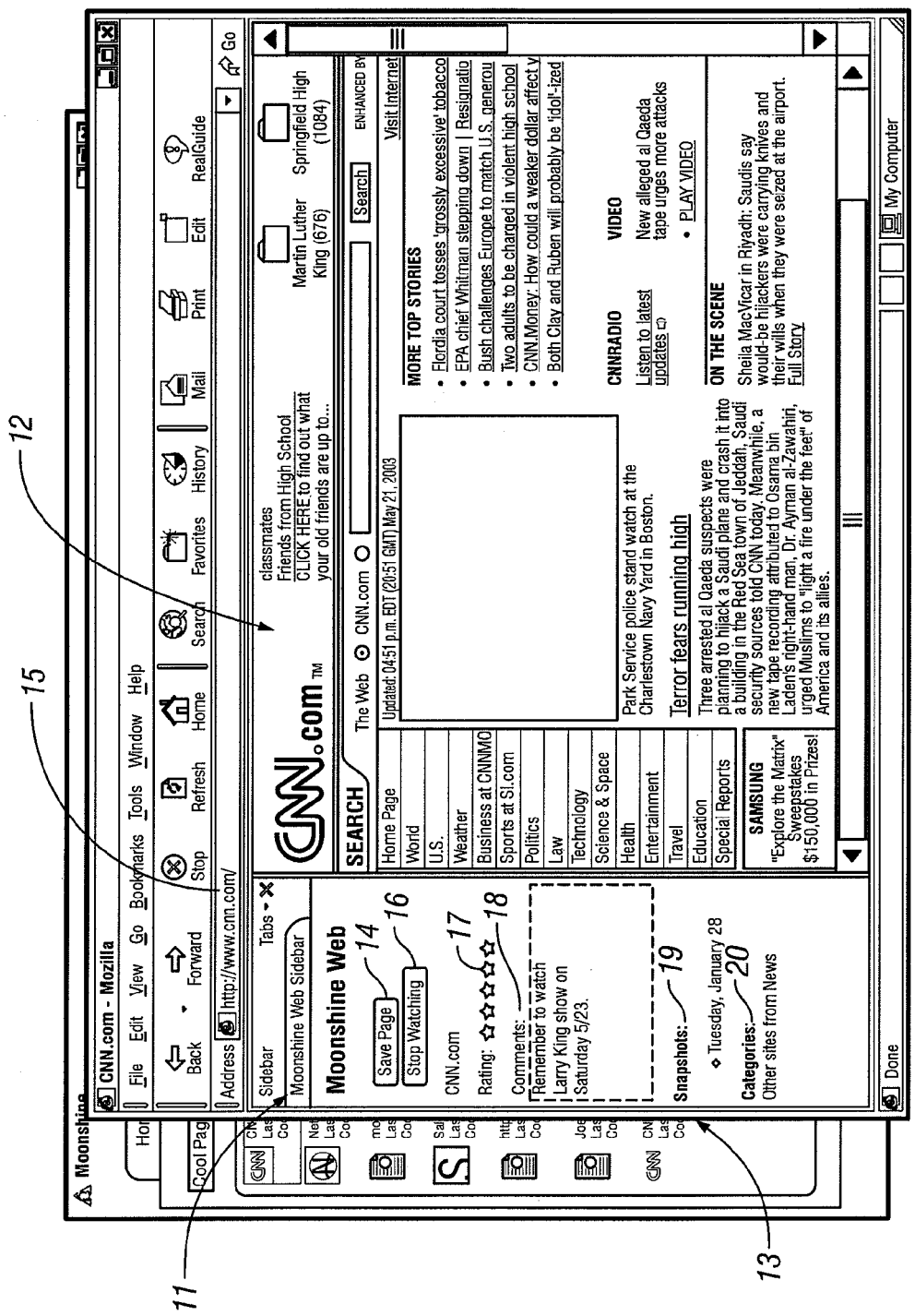
FIG. 1 is a screen display of Web browsing tools that display metadata and allow capturing an image or Web page according to the invention.

FIG. 1 is a screen display of Web browsing tools that display metadata and allow capturing an image or Web page according to the invention. In FIG. 1, a sidebar 11 associated with the Web page cnn.com 12, note the URL 15, shows tools that include "Save Page" 14 and "Stop Watching" 16. A Rating 17, Comments 18, Snapshots 19, and Categories 20 section of metadata 13 is also shown. Those skilled in the art will appreciate that various other types of information may comprise metadata, e.g. links, images, and various statistics.

Figure 2:
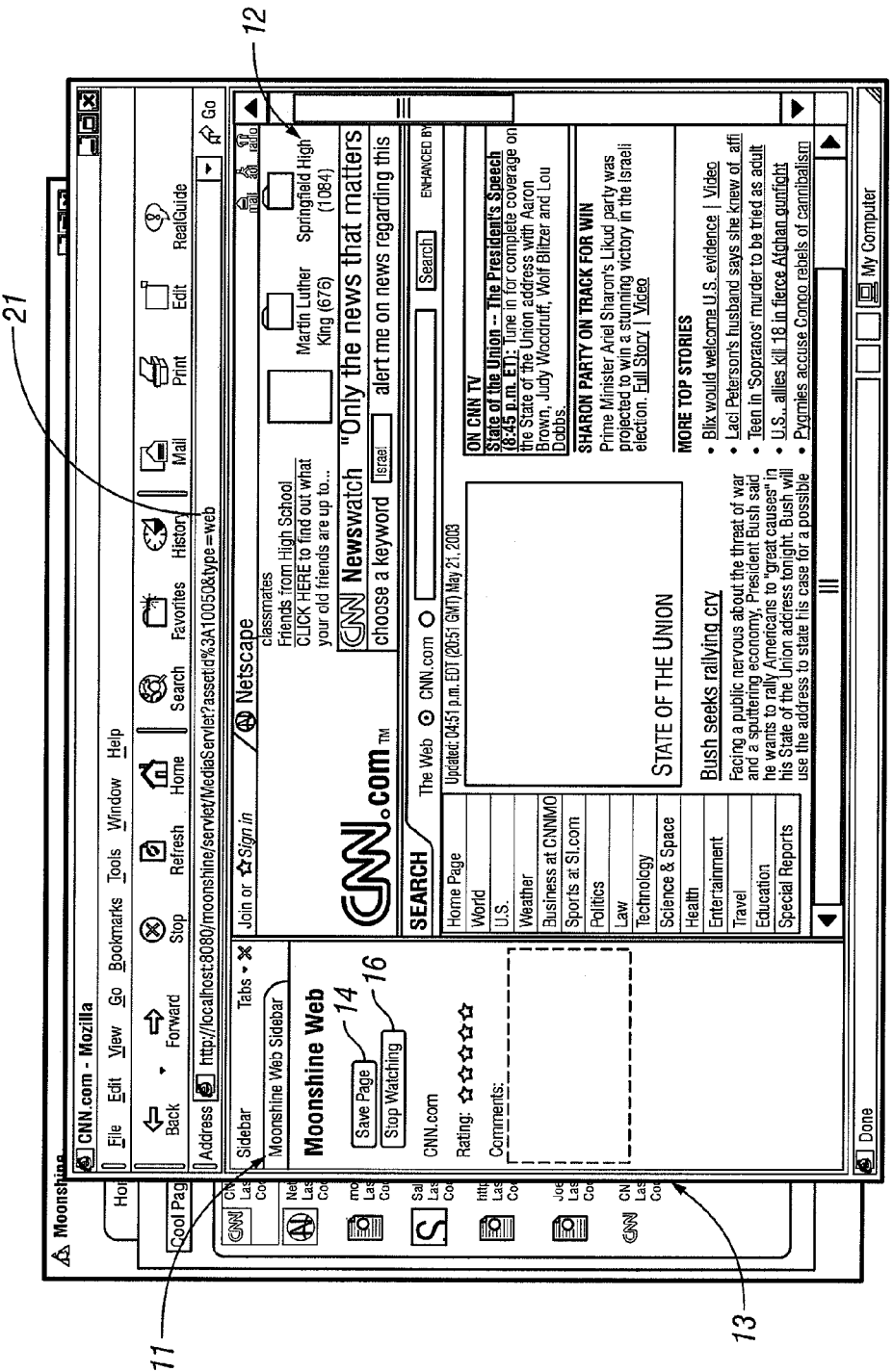
FIG. 2 is a screen display of captured Web pages that are stored as part of a media library according to the invention.

FIG. 2 is a screen display of captured Web pages that are stored as part of a media library according to the invention. In FIG. 2, the Web page cnn.com 12' is a captured Web page that is displayed from a local source (note the URL 21). The Web page was captured by selecting the "Save Page" button (FIG. 1). In this way, the Web page may be viewed and searched even if the original page is changed or becomes unavailable.

Figure 3:
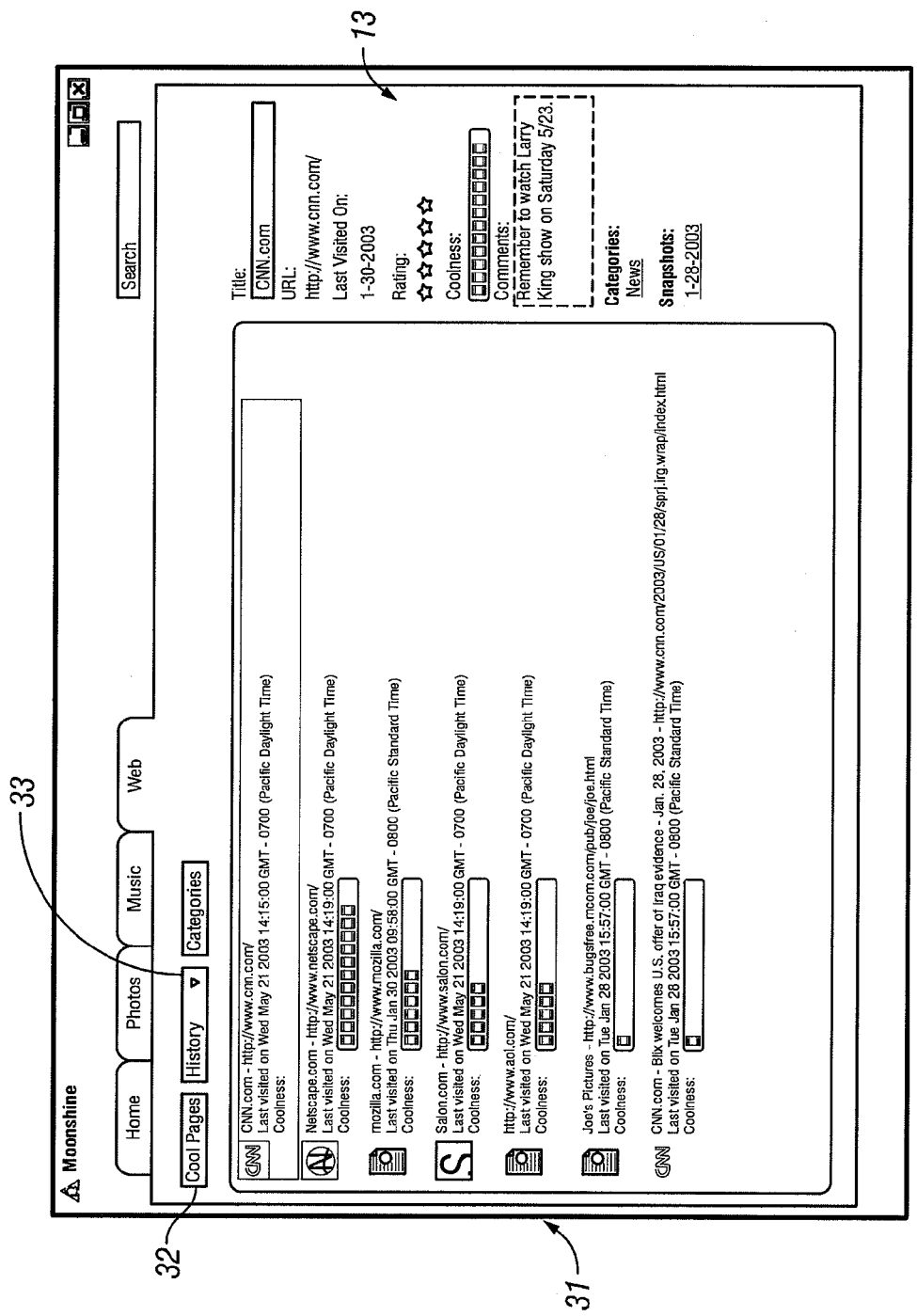
FIG. 3 is a screen display showing Web pages that are part of a browsing history or that have been captured locally according to the invention.

FIG. 3 is a screen display showing Web pages that are part of a browsing history or that have been captured locally according to the invention. In FIG. 3, Web pages that have either been captured locally or that are part of a browsing history 31 can be viewed in multiple ways, such as a passively personalized Web favorites list Cool Pages 32, or in a time-based history view 33. Note that metadata 13 for a highlighted page are displayed when the page is selected. Double clicking the page entry in the list retrieves the page from local storage for viewing by the user.

Figure 4:
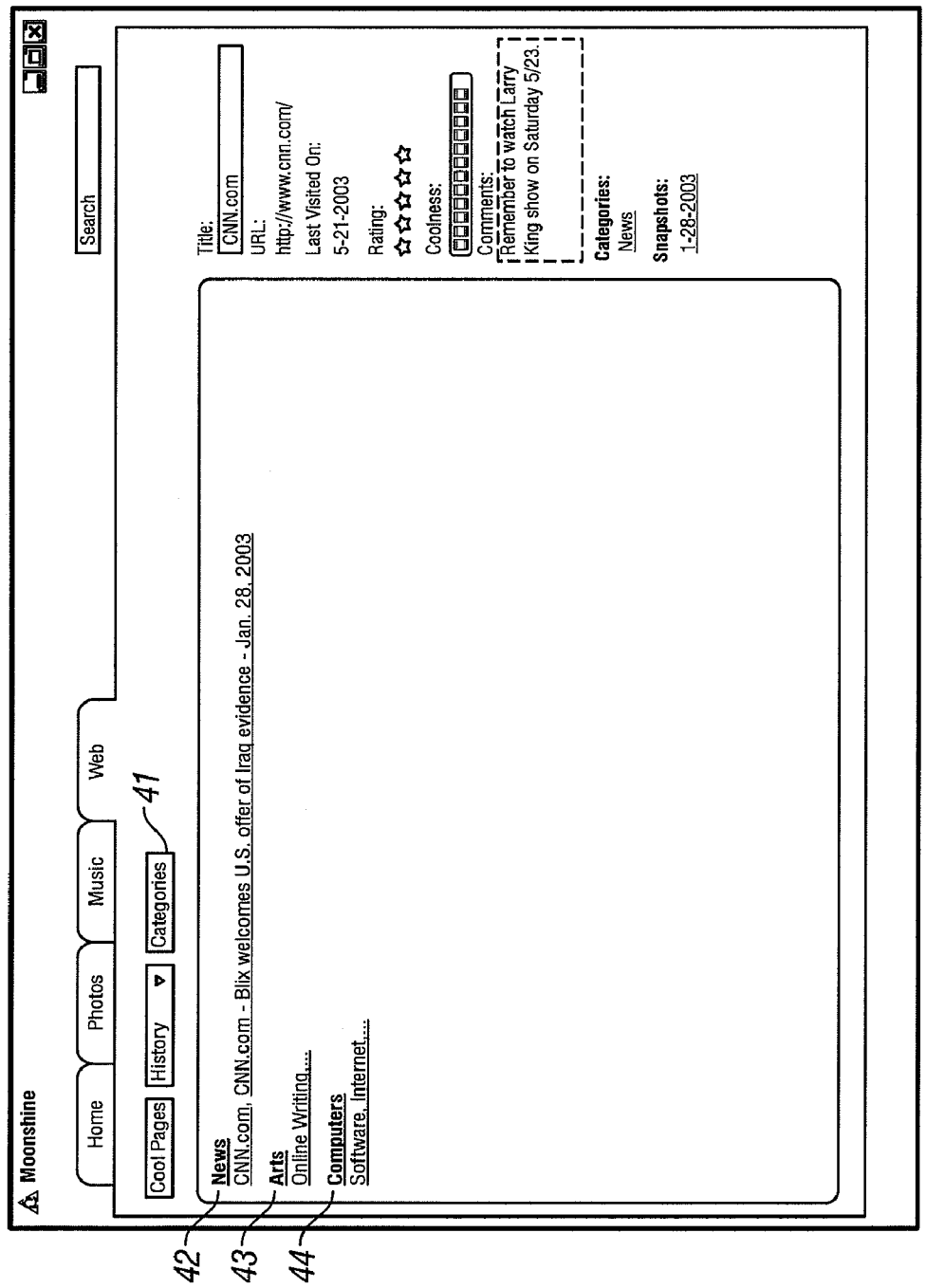
FIG. 4 is a screen display showing categories of Web pages acquired from a external source according to the invention.

FIG. 4 is a screen display showing categories of Web pages acquired from an external source according to the invention. In FIG. 4, a Categories tab 41 is selected, thereby displaying various categories of pages, e.g. News 42, Arts 43, and Computers 44, acquired from an external source, such as Google. Those skilled in the art will appreciate that any number of categories and sub-categories may be provided.

A particular feature of the invention leverages the existing publicly accessible databases of URL categorization and uses that information to build a presentation in the browser that users can navigate and explore. For example, the Open Directory Project (ODP; see http://dmoz.org/) is a widely distributed database of Web content classified by humans. ODP maintains a database, and exposes a Web interface, that allows navigating through categories to find Web sites (see FIG. 5). This is similar to the service for which Yahoo! was initially famous. Google leverages the ODP database to allow reverse lookups, i.e. finding the category for a given URL. For instance, the Google entry for aol.com shows it to be in the category: Computers >Internet >Access Providers >International >AOL.

These categories are structured as trees, where each node has zero or one parents and zero or many children.

Figure 6:
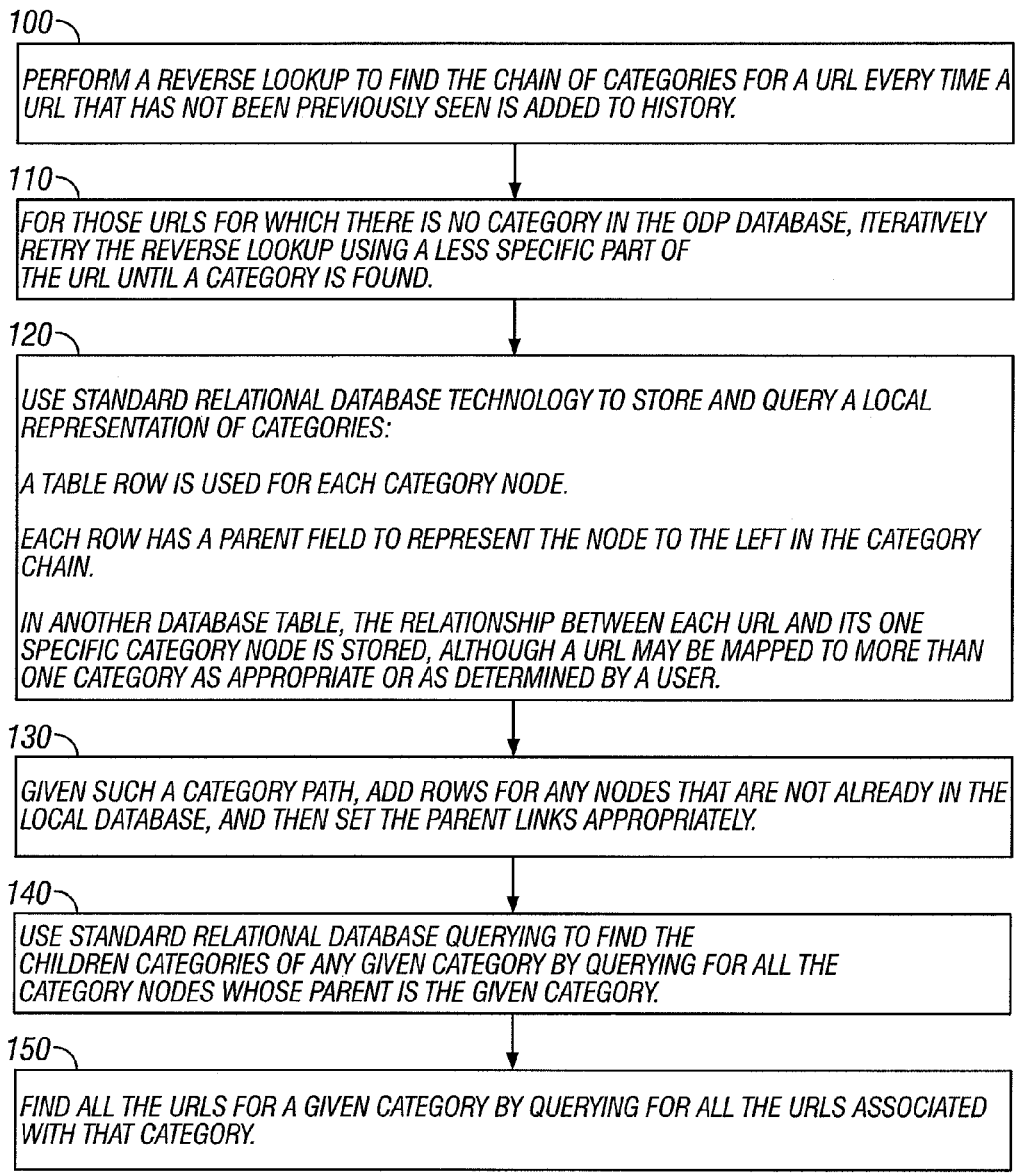
FIG. 6 is a flow diagram showing a Web browsing history categorization method according to the invention.

As shown in FIG. 6, the key steps performed in the presently preferred embodiment of the invention comprise:

1. Every time a URL that has not been previously seen is added to history, a reverse lookup is performed to find the chain of categories for the URL (100).
2. For some URLs there is no category in the ODP database. For instance, the URL might represent some obscure page in a Web pod. In that case, the system iteratively retries the reverse lookup using a less specific part of the URL until a category is found (110). For instance, if no category is found for http://www.cnn.com/stories/entertainment/12345.html, then the system searches for a category for http://www.cnn.com/stories/entertainment and, if that fails, then http://www.cnn.com/stories, and so on.
3. Standard relational database technology is used to store and query a local representation of categories (120). A table row is used for each category node. Each row has a parent field to represent the node to the left in the category chain. For instance, given a chain "Computers >Internet >Access Providers >International >AOL" the 'AOL' node has the 'International' node set as its parent. In another database table, the relationship between each URL and its one specific category node is stored, although a URL may be mapped to more than one category as appropriate or as determined by a user.

4. Given such a category path, add rows for any nodes that are not already in the local database, and then set the parent links appropriately (130).

5. Using standard relational database querying, find the children categories of any given category by querying for all the category nodes whose parent is the given category (140). Similarly, find all the URLs for a given category by querying for all the URLs associated with that category (150).

This data model permits one to build interactive user interfaces that allow users to navigate among the categories corresponding to URLs that have been previously visited while browsing. Unlike the ODP user interface, it does not include categories that correspond to pages the user has never visited.

The user interface for this hierarchy of data can be displayed as a tree list, as with the Windows file system Explorer, or as a series of Web-style pages, as with the OPD Website. The resultant user interface allows users to re-find Web sites by drilling down through familiar categories. It also allows users to discover groups of previously visited pages which happen to fall into the same category. This grouping can be very useful to users. Optionally, from any given category display the user interface can supply a link back to the full ODP Web page for that category. Thus, within the same user interface, the user can focus on previously visited pages and then navigate to a wider view of similar pages that might be worth exploring.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for establishing and maintaining a categorized Web browsing history of a user, comprising the steps of:
   for websites previously visited by the user, performing a reverse lookup in a database to find a chain of categories for a URL, every time a URL that has not been previously seen is added to a history;
   for URLs for which there is no category in said database, iteratively retrying said reverse lookup using a less specific part of said URL until a category is found;
   presenting in an interactive user interface a resulting categorized web browsing history corresponding to said websites previously visited by the user;
   for a given category of previously visited web pages within said interactive user interface, said interactive user interface providing a link to said given category within a database of Web content never visited by the user;
   wherein the user views previously visited pares within said interactive user interface and follows a link to a wider view of similar pages through said link;
   providing a plurality of Web browsing tools that display metadata and that allow capturing an image or Web page;
   wherein said tools comprise any of Save Page and Stop Watching;
   wherein said metadata comprise any of Rating, Comments, Snapshots, and Categories; and
   viewing Web pages that have either been captured locally or that are part of a browsing history as any of a passively personalized Web favorites list and in a time-based history view.

2. The method of claim 1, further comprising the step of:
   using standard relational database technology to store and query a local representation of said categories.

3. The method of claim 2, further comprising the step of:
   using a row in a first database table for each category node, wherein each row has a parent field to represent a node in a category chain.

4. The method of claim 3, further comprising the step of:
   using a second database table to store a relationship between each URL and its one specific category node.

5. The method of claim 4, further comprising the steps of:
   given a category path, adding rows for any nodes that are not already in said local database; and
   selling parent links appropriately.

6. The method of claim 5, further comprising the step of:
   using standard relational database querying to find children categories of any given category by querying for all category nodes whose parent is a given category.

7. The method of claim 6, further comprising the step of:
   finding all URLs for a given category by querying for all URLs associated with said category.

8. The method of claim 1, wherein said user interface for a hierarchy of data is displayed as either of a tree list and a series of Web-style pages.

9. The method of claim 1, wherein said user interface allows users to re-find Web sites by drilling down through familiar categories.

10. The method of claim 1, wherein said user interface allows users to discover groups of previously visited pages which happen to fall into a same category, wherein said previously visited pages comprise pages previously visited by a user of said user interface.

11. The method of claim 1, wherein within a same user interface, a user can focus on pages previously visited by said user and then navigate to a wider view of similar pages.

12. The method of claim 1, wherein said database comprises the Open Directory Project.

13. The method of claim 12, wherein said database exposes a Web interface, and allows navigating through categories to find Web sites.

14. The method of claim 1, further comprising the step of:
   storing captured Web pages as part of a media library;
   wherein a captured Web page may be viewed and searched even if an original page is changed or becomes unavailable.

* * * * *